(12) United States Patent
Kitaguchi

(10) Patent No.: US 8,651,670 B2
(45) Date of Patent: Feb. 18, 2014

(54) PROJECTION TYPE IMAGE DISPLAY DEVICE

(75) Inventor: Akihiro Kitaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 589 days.

(21) Appl. No.: 12/605,822

(22) Filed: Oct. 26, 2009

(65) Prior Publication Data

US 2010/0118282 A1 May 13, 2010

(30) Foreign Application Priority Data

Nov. 11, 2008 (JP) ................................ 2008-288509

(51) Int. Cl.
*H04N 5/64* (2006.01)

(52) U.S. Cl.
USPC .............................. 353/79; 353/119; 348/744

(58) Field of Classification Search
USPC ............ 353/79, 119; 348/744, 787, 789, 739; 359/453, 460
See application file for complete search history.

(56) References Cited

U.S. PATENT DOCUMENTS

| | | | |
|---|---|---|---|
| 4,639,106 A * | 1/1987 | Gradin | 353/13 |
| 5,654,776 A | 8/1997 | Furuya | |
| 6,334,687 B1 * | 1/2002 | Chino et al. | 353/79 |
| 7,365,806 B2 * | 4/2008 | Kitaguchi et al. | 348/744 |
| 2005/0174497 A1 | 8/2005 | Kitaguchi et al. | |
| 2007/0252059 A1 | 11/2007 | Katsumata et al. | |

FOREIGN PATENT DOCUMENTS

| | | |
|---|---|---|
| CN | 1743944 A | 3/2006 |
| JP | 51-74121 U | 6/1976 |
| JP | 8-76256 A | 3/1996 |
| JP | 8-122924 A | 5/1996 |
| JP | 8-154222 A | 6/1996 |
| JP | 2000-352770 A | 12/2000 |
| JP | 2004-317862 A | 11/2004 |
| JP | 2005-221834 A | 8/2005 |

* cited by examiner

*Primary Examiner* — Tony Ko

(74) *Attorney, Agent, or Firm* — Birch, Stewart, Kolasch & Birch, LLP

(57) ABSTRACT

A projection type image display device of the present invention includes: a screen unit with a screen onto which images are projected; a projection unit for projecting images onto the screen from the rear surface of the screen; right and left slide mechanisms as a pair for supporting the screen unit in a manner that allows the screen unit to move in a direction approximately normal to the screen; and a link shaft for linking the right and left slide mechanisms, and for moving the right and left mechanisms in synchronization with each other.

14 Claims, 12 Drawing Sheets

F I G . 1
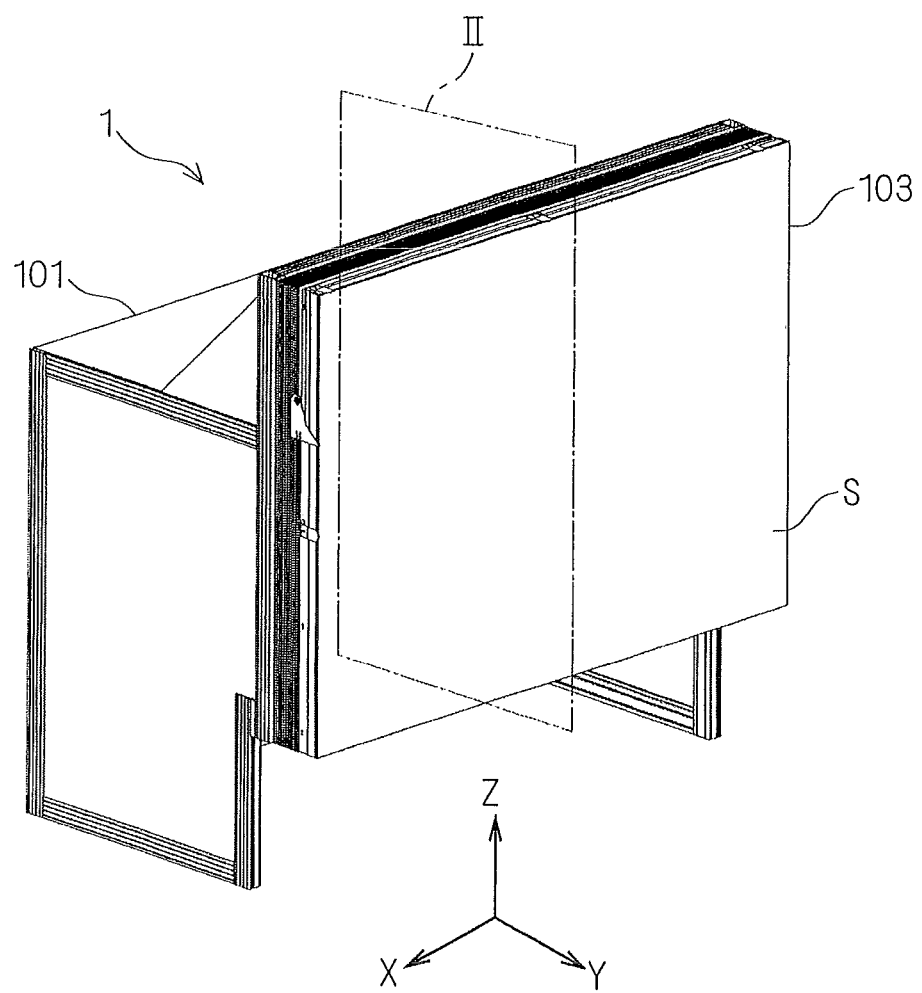

F I G . 1 2
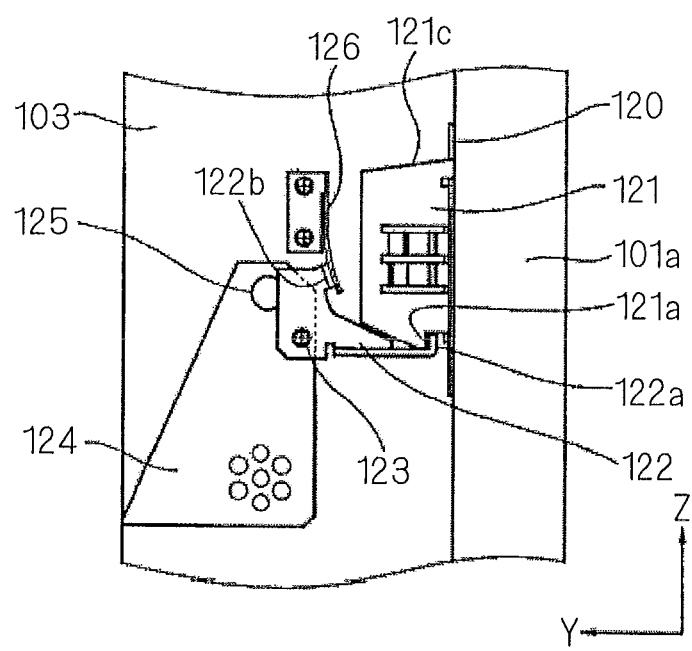

PROJECTION TYPE IMAGE DISPLAY DEVICE

BACKGROUND OF THE INVENTION

1. Field of the invention

The present invention relates to a projection type image display device, and more specifically relates to a projection type image display device for projecting images on a screen from its rear surface to display the images on the screen.

2. Description of the Background Art

Conventionally known projection type image display devices include a rear projection type image display device for projecting images from a projection unit onto a screen from its rear surface. In a commonly used rear projection type image display device, a screen unit with a screen is attached by screws and the like from the rear surface of a casing storing therein a projection unit and others to the front surface of the casing, in a manner that allows the screen unit to be detached from the casing. As a result of a trend toward reduced space for placing a projection type image display device in recent years, a newly developed projection type image display device is such that the rear surface of a casing can closely contact a wall, and all maintenance work can be performed from the front surface of the casing. So, the simple and cost-saving structure of such a projection type image display device is required.

A projection type image display device for which maintenance can be performed from the front surface of a casing is introduced for example in Japanese Patent Application Laid-Open No. 2005-221834. According to the projection type image display device introduced therein, fall and the like of a screen unit during attachment or detachment thereof is prevented, so the screen unit can be attached and detached with a high degree of reliability.

According to the disclosure of Japanese Patent Application Laid-Open No. 2005-221834, parts should be changed as a result of the change in size of a screen or a casing. Further, a large number of parts constituting the projection type image display device results in a complicated structure thereof. So, assembly of the device requires much time and high cost. Still further, it is hard to make fine adjustment in attaching the screen unit to the casing. So, when the screen unit slides forward from the casing, the screen unit goes out of its adjustment position. As a result, when a plurality of projection type image display devices are arranged (vertically and horizontally), neighboring screen units may be damaged by contacting with each other.

SUMMARY OF THE INVENTION

The present invention is intended to provide a projection type image display device capable of improving operability by simplifying a structure, while realizing fine adjustment in attaching a screen unit.

A projection type image display device of the present invention includes: a screen unit with a screen onto which images are projected; a projection unit for projecting images onto the screen from the rear surface of the screen; right and left slide mechanisms as a pair for supporting the screen unit in a manner that allows the screen unit to move in a direction approximately normal to the screen; and a link shaft for linking the right and left slide mechanisms, and for moving the right and left mechanisms in synchronization with each other.

According to the present invention, the projection type image display device includes: the screen unit with the screen onto which images are projected; the projection unit for projecting images onto the screen from the rear surface of the screen; the right and left slide mechanisms as a pair for supporting the screen unit in a manner that allows the screen unit to move in a direction approximately normal to the screen; and the link shaft for linking the right and left slide mechanisms, and for moving the right and left mechanisms in synchronization with each other. Thus, operability is improved by simplifying the structure, while fine adjustment in attaching the screen unit is realized.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view of a projection type image display device according to a preferred embodiment of the present invention;

FIGS. 12 and 13 are side views of a position adjustment mechanism of the projection type image display device in the background art.

DESCRIPTION OF THE PREFERRED EMBODIMENTS

A preferred embodiment of the present invention is described below with reference to drawings.

The technique introduced in Japanese Patent Application Laid-Open No. 2005-221834, based on which the present invention has been made, is described first.

Figure 11:
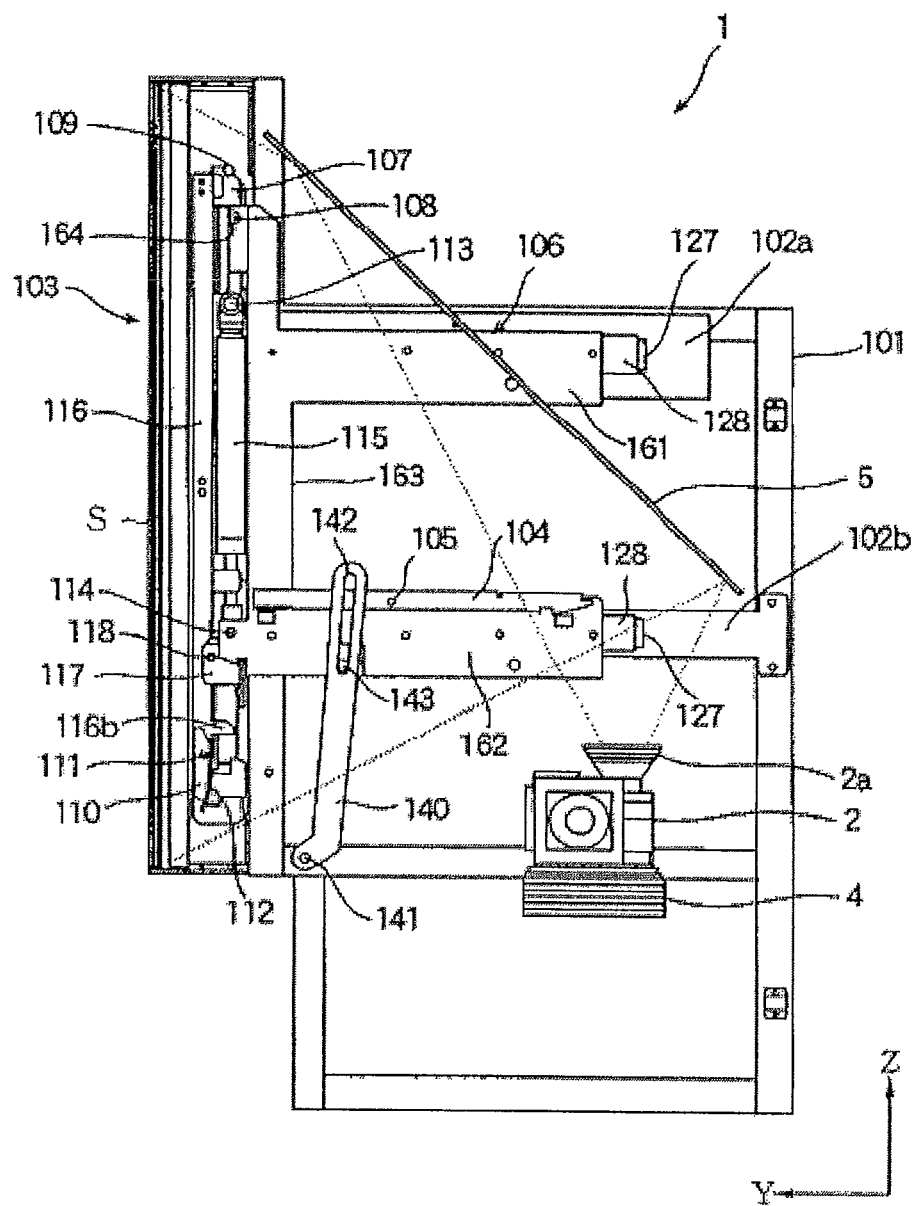
FIG. 11 is a side sectional view of a projection type image display device in the background art.

FIG. 11 is a side sectional view of a projection type image display device in the background art. As shown in FIG. 11, a shaft 141, an oscillating lever 140 and others are provided to link a slide base 106 arranged on the left side surface of a casing, and a slide base (not shown) arranged on the right side surface of the casing, and to move the right and left slide bases in synchronization with each other. However, the degree of accuracy of synchronization is low due to the great length of the oscillating lever 140. Further, these parts may be required to be changed each time a screen or a casing is changed in size. Also, each time a screen unit 103 is changed in size or weight, other parts such as a damper for reducing the weight of the screen unit 103 should be changed as well when the screen unit 103 is opened or closed.

Figure 13:
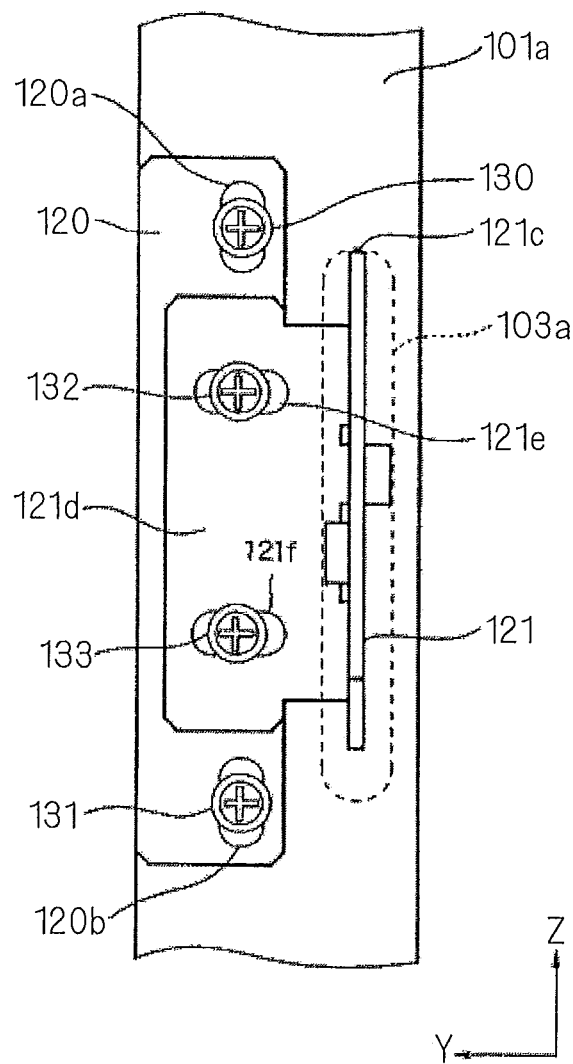

FIG. 12 is a side view of a position adjustment mechanism of the projection type image display device in the background art. In order for the screen unit 103 to come in close contact with the casing 101, the screen unit 103 makes contact with a fix plate 120 and an engagement plate 121 provided to the casing 101, so that the position of the screen unit 103 is fixed in upward and downward directions, and in rightward and leftward directions. However, when the screen unit 103 slides forward from the casing 101, the screen unit 103 is disengaged from a position adjustment plate, thereby going out of its adjustment position. Thus, when a plurality of projection type image display devices are arranged in rows and columns, neighboring screen units may be damaged by contacting with each other. As shown in FIGS. 12 and 13, the fix plate 120 and the engagement plate 121 are inserted into an engagement hole 103a defined in the screen unit 103. So, position adjustment of the screen unit 103 is not realized unless the screen unit 103 is in a condition after sliding forward from the casing 101. Further, the fix plate 120 and the engagement plate 121 are bounded only by screws 130 to 133. So, it is hard to make fine position adjustment of the fix plate 120 and the engagement plate 121.

As shown in FIG. 11, an open/close stopper 117 arranged on the closed ends of a slide stopper 104 of a slide unit and the screen unit 103 is provided to the slide unit arranged on each of opposite side surfaces of the casing 101. The open/close stoppers 117 should be handled simultaneously with both hands for releasing the open/close stoppers 117 from their stop positions. So, when a screen is of such a size that the open/close stoppers 117 cannot be touched simultaneously with both hands, a mechanism for holding the release of the open/close stoppers 117 should be provided. This results in complicated operation and high cost.

As also shown in FIG. 11, the slide unit is constituted by many parts, requiring a large number of screws for attaching the slide unit to the casing 101. The screen unit 103 also includes many parts to be attached to a frame screen and uses a large number of screws, requiring much time for attachment.

The preferred embodiment of the present invention is intended to provide a projection type image display device capable of improving operability by simplifying a structure while realizing fine adjustment in attaching a screen unit, as is described in detail below.

FIG. 1 is a perspective view of a projection type image display device 1 according to the preferred embodiment of the present invention. As shown in FIG. 1, the projection type image display device of the present preferred embodiment includes a casing 101, and a screen unit 103 with a screen S onto which images are projected. The screen S is arranged at the front surface of the screen unit 103. Images are displayed on the screen S in the condition shown in FIG. 1 (in the condition allowing image projection). In FIG. 1, a horizontal direction of the screen S is called an X direction (rightward and leftward directions), a vertical direction of the screen S is called a Z direction (upward and downward directions), and a direction normal to the display surface of the screen S is called a Y direction (forward and backward directions). The direction Y includes a +Y direction (forward direction) in which a distance from the casing 101 to the screen unit 103 becomes shorter, and a −Y direction (backward direction) opposite to the +Y direction. The directions described above are defined for the convenience of description, and do not limit the direction of the projection type image display device 1 when used. The projection type image display device 1 of the present preferred embodiment can be used by itself. Alternatively, a plurality of projection type image display devices 1 may be arranged in rows and columns, thereby serving as a multi-projector.

Figure 2:
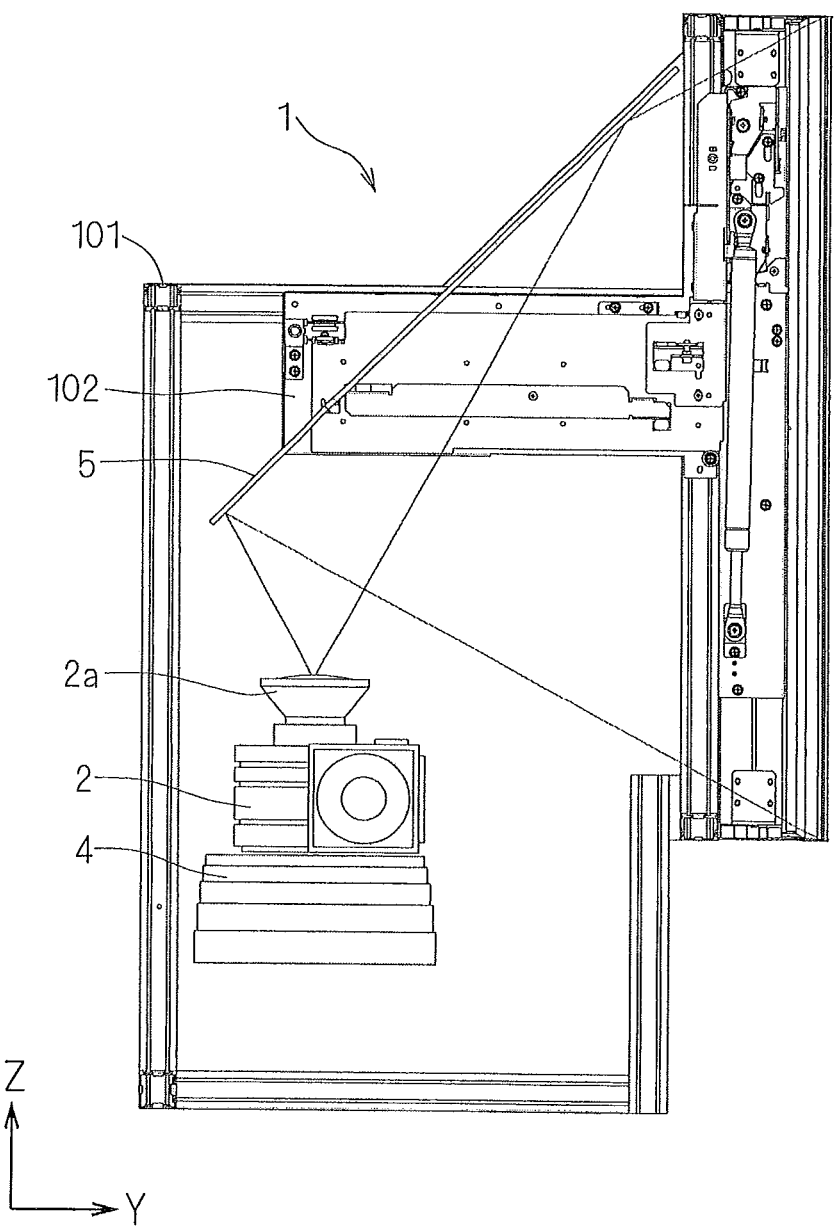
FIGS. 2 to 4 are side sectional views of the projection type image display device according to the preferred embodiment of the present invention.

FIG. 2 is a side sectional view of the projection type image display device 1 according to the preferred embodiment of the present invention. As shown in FIG. 2, a projection unit 2 for projecting images through a projection lens 2a onto the screen S from its rear surface is arranged inside the casing 101. A mirror 5 for causing the reflection of light emitted from the projection unit 2 is arranged in an optical path of the emitted light. A position adjustment mechanism 4 is provided under the projection unit 2 in order to make relative position adjustment of the projection unit 2 with respect to the screen S. The projection unit 2, the position adjustment mechanism 4 and the mirror 5 are omitted from FIG. 3 and from subsequent figures.

The screen unit 103 shown in FIGS. 1 and 2 is capable of moving in forward and backward directions (in the Y direction) with respect to the casing 101, while being capable of pivoting about an axis defined in the rightward and leftward directions (X direction). Structures for the screen unit 103 to move and pivot are described in order below.

A structure for moving the screen unit 103 in the forward and backward directions with respect to the casing 101 is described first.

Figure 3:
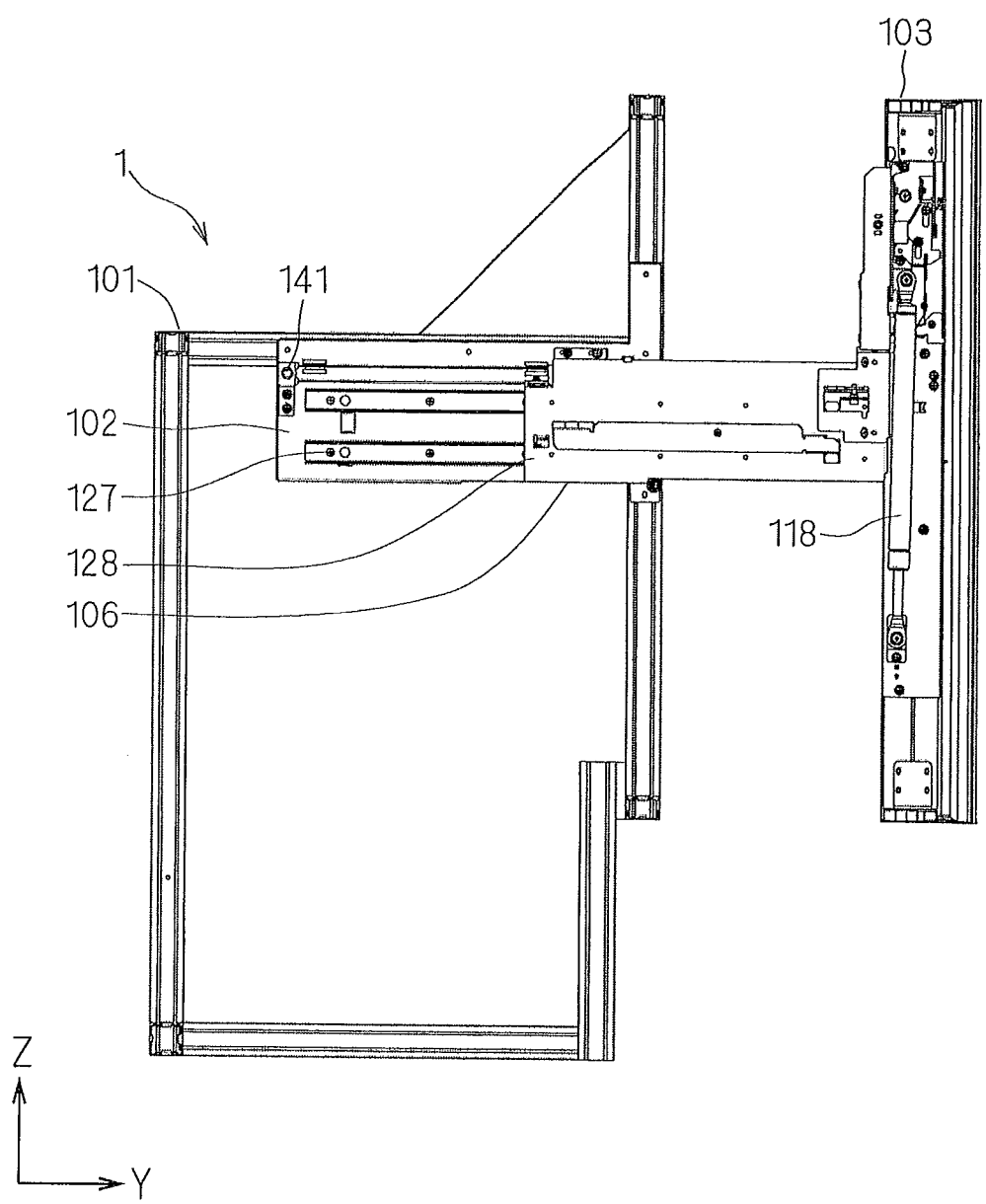

FIG. 3 is a side sectional view of the projection type image display device 1 according to the preferred embodiment of the present invention, showing a condition where a slide base 106 protrudes forward (in the +Y direction) to its utmost position from the casing 101. The position of the slide base 106 at this time is called a protruding position. A base plate 102 with a long dimension in the forward and backward directions is fixed to the inner side of each of opposite side surfaces of the casing 101. The base plate 102 is provided with a slide rail 127 extending in the forward and backward directions. The slide base 106 with a slider 128 is so arranged that the slider 128 can move along the slide rail 127. The screen unit 103 moves in the forward and backward directions when a user applies force forward or backward to the slide base 106. The slide bases 106 and the slide rails 127 are arranged at the inner sides of the opposite side surfaces of the casing 101, at positions opposite to those of the respective counterparts.

Figure 4:
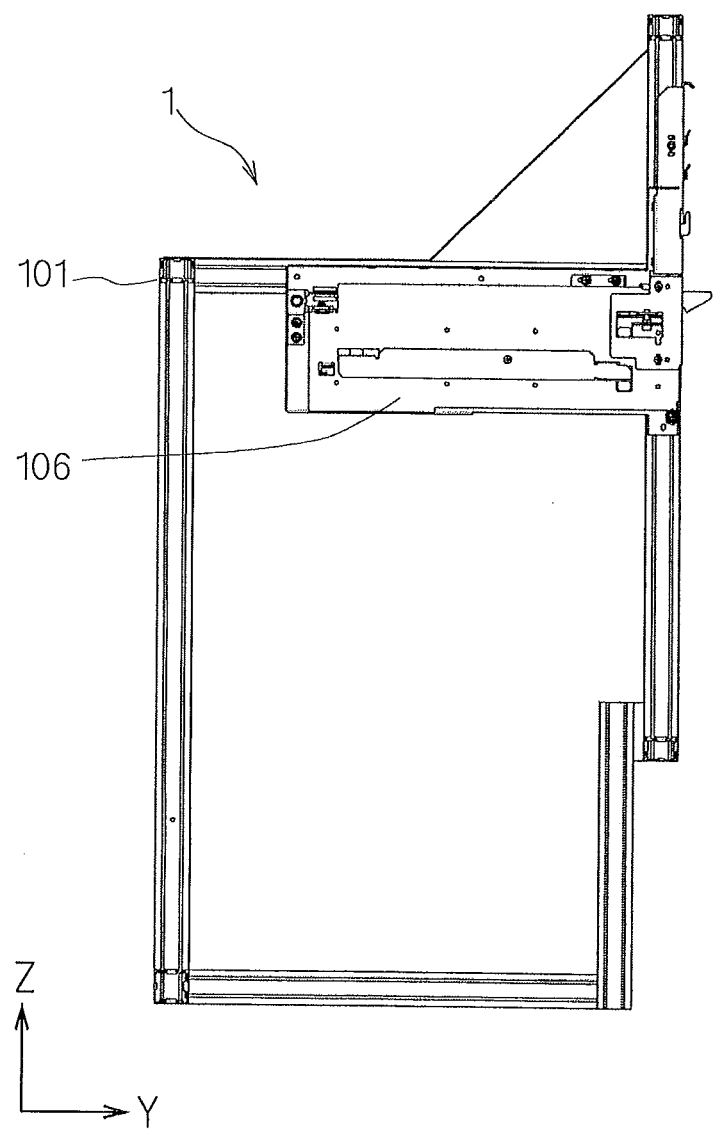
Figure 5:
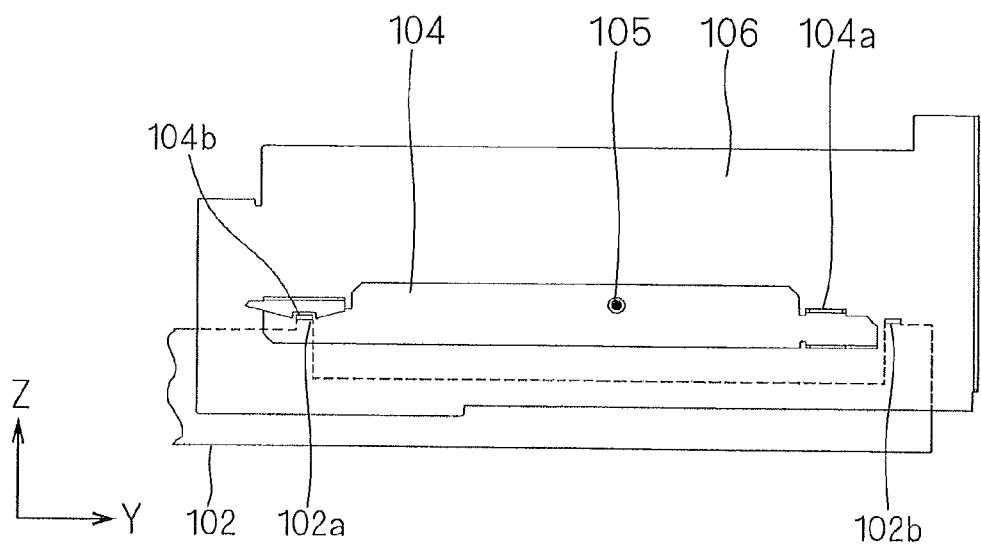
FIG. 5 is a side view of a lock mechanism of a side base of the projection type image display device according to the preferred embodiment of the present invention.

FIG. 4 is a side sectional view of the projection type image display device 1 according to the preferred embodiment of the present invention, showing a condition where the slide base 106 has moved backward (in the −Y direction) of the casing 101 to its utmost position. The position of the slide base 106 at this time is called a stored position. A lock mechanism is provided as shown in FIG. 5 described later in order to avoid the inadvertent movement of the slide base 106 and to lock the slide base 106 at the stored position when the screen unit 103 is not attached. The lock mechanism shown in FIG. 5 is also provided to avoid the movement of the slide base 106 when the screen unit 103 pivots, or is attached or detached in the condition shown in FIG. 3.

FIG. 5 is a side view of the lock mechanism of the slide base 106 of the projection type image display device 1 according to the preferred embodiment of the present invention. As shown in FIG. 5, a slide stopper 104 (first lock member) with a long dimension in the forward and backward directions of the casing 101 is provided on the slide base 106 and at the lower part of the slide base 106. The slide stopper 104 is supported by a shaft 105 at approximately the central portion of its length direction, in a manner that allows the slide stopper 104 to oscillate. The slide stopper 104 has a recess 104b defined near its rear end, and in the downward direction (−Z direction). The slide stopper 104 balances by its own weight about the shaft 105, so that the slide stopper 104 is caused to oscillate counterclockwise in FIG. 5. The slide stopper 104 may be provided to one of slide mechanisms. The slide stopper 104 is locked at a predetermined position at which the screen unit 103 can be attached or detached.

The base plate 102 has projections 102a and 102b capable of engaging with the recess 104b defined in the slide stopper 104. When the slide base 106 is at the stored position, the projection 102a of the base plate 102 engages with the recess 104b of the slide stopper 104, thereby locking the slide base 106. When the slide base 106 moves to reach the protruding position, the projection 102b of the base plate 102 engages with the recess 104b of the slide stopper 104, thereby locking the slide base 106. That is, the fixed projections and the movable recess constituting the slide mechanism are fitted with each other to lock the slide base 106. Regarding release of the lock, a user presses a bent part 104a formed at the front end of the slide stopper 104 downward to release the lock of the slide base 106. So, the slide base 106 is allowed to freely move between the stored position and the protruding position. When the screen unit 103 is attached, the slide base 106 does not reach the stored position, and is not locked accordingly.

Figure 6:
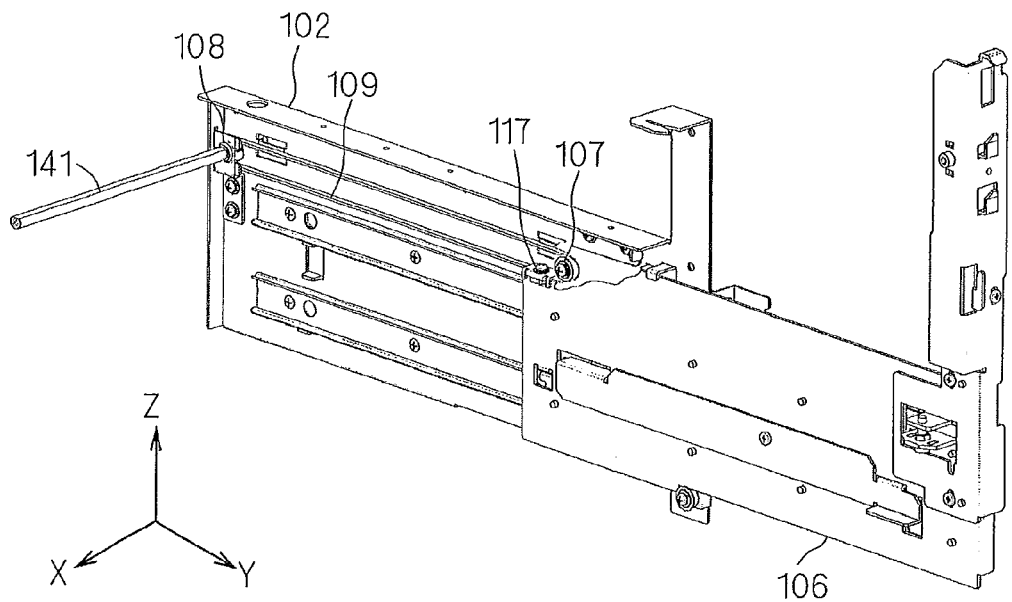
FIG. 6 is a perspective view of a slide mechanism of the projection type image display device according to the preferred embodiment of the present invention.

FIG. 6 is a perspective view of the slide mechanism of the projection type image display device 1 according to the preferred embodiment of the present invention. As shown in FIG. 6, a bearing 107 and a pulley 108 are provided at the front and the rear side of the base plate 102 respectively, in a manner that allows the bearing 107 and the pulley 108 to pivot. A timing belt 109 is provided to link the bearing 107 and the pulley 108. One end of the timing belt 109 is tied to the slide base 106 with a plate 117. The slide mechanism shown in FIG. 6, and a slide mechanism as its counterpart are arranged on the right side surface and the left side surface of the casing 101, so that the screen unit 103 is supported in a manner that allows the screen unit 103 to move in a direction approximately normal to the screen S (Y direction). The pulley 108 has a D-shaped hole inside. Each end of a link shaft 141 of the same shape is inserted into the hole of the pulley 108 of each base plate 102, by which the right and left slide mechanisms as a pair are linked and thus can move in precise synchronization with each other. So, the slide stopper 104 may be provided either to the right slide mechanism or to the left slide mechanism as its counterpart.

A structure for attaching the screen unit 103 to the slide base 106 is described next.

Figure 7:
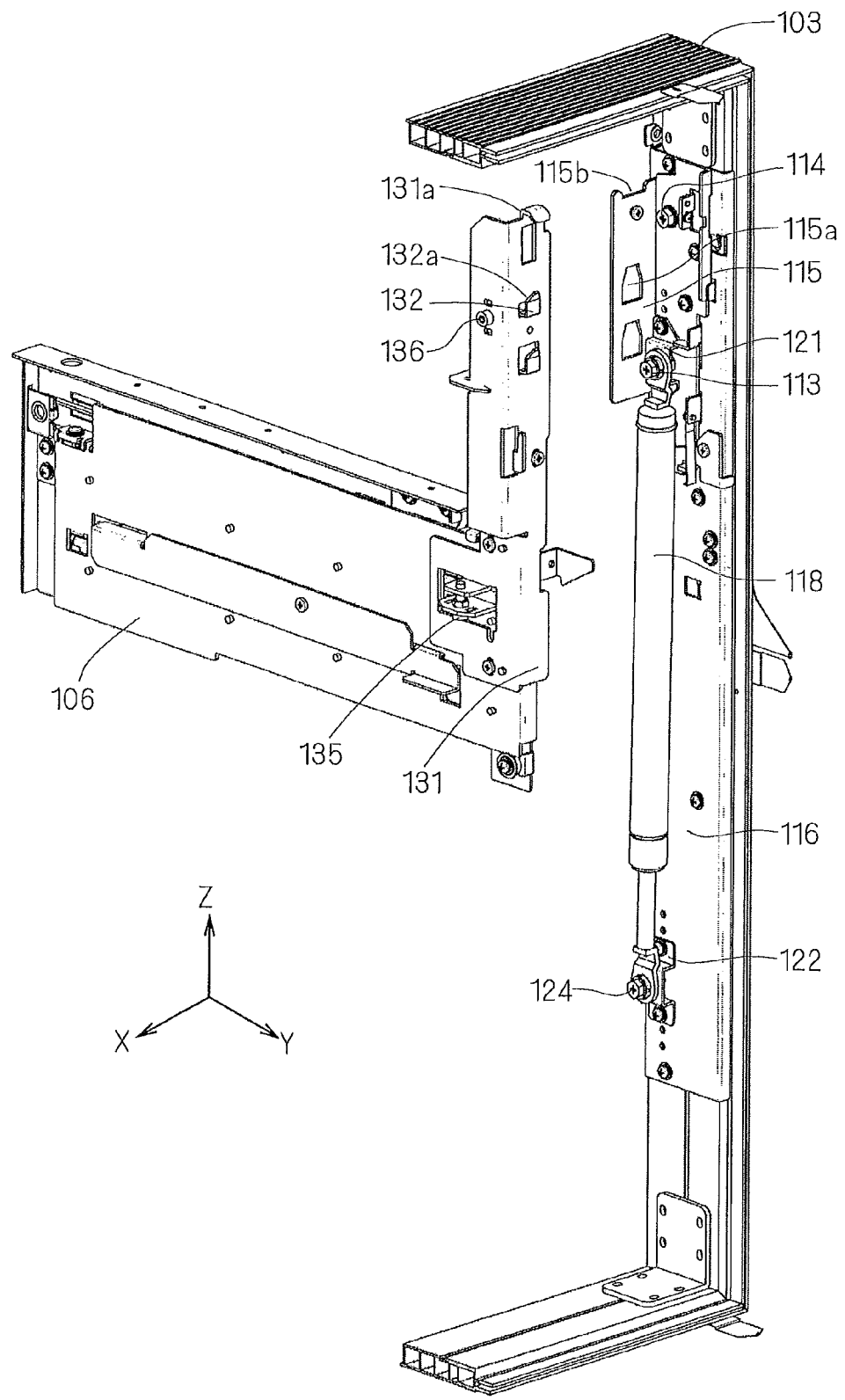
FIG. 7 is a perspective view of an engagement mechanism of the projection type image display device according to the preferred embodiment of the present invention.

FIG. 7 is a perspective view of an engagement mechanism of the projection type image display device 1 according to the preferred embodiment of the present invention. In order to improve visibility, the screen unit 103 and the slide base 106 are shown to be separated in FIG. 7. The engagement mechanism is intended to engage the casing 101 and the screen unit 103. The slide base 106 has a hanger plate 131. The side base 106 has a hanger plate 131. A bolt 135 (second position adjuster) rotates so that the hanger plate 131 can move in the upward and downward directions (Z direction). The hunger plate 131 has a holder plate 132. A bolt 136 (first position adjuster) rotates so that the holder plate 132 can move in the rightward and leftward directions (X direction). That is, a position adjuster provided to the slide mechanism for making position adjustment of the screen unit 103 with respect to the casing 101 includes the bolt 135 for making position adjustment in the upward and downward directions (approximately the vertical direction), and the bolt 136 for making position adjustment in the rightward and leftward directions (in approximately the horizontal direction). The hanger plate 131 and the holder plate 132 are provided to each of the slide bases 106. However, the adjustment mechanism in the rightward and leftward directions realized by the bolt 136 is provided to either the right or the left side surface.

The screen unit 103 has a pivot plate 115. An angular hole 115a (fitting hole) is so defined in the pivot plate 115 that the angular hole 115a is fitted with a tip bent part (hook-shaped projection) 132a of the holder plate 132 in the upward and downward directions (Z direction), and in the rightward and leftward directions (X direction). That is, the pivot plate 115 has the fitting hole capable of being fitted with the hook-shaped projection of the slide mechanism. This means that the engagement mechanism realizes engagement by making the fit between the hook-shaped projection of the slide mechanism and the fitting hole defined in the pivot plate of the screen unit. This structure allows the screen unit 103 to be moved between the stored position and the protruding position by the slide base 106 without changing the screen unit 103 in position adjusted in the rightward and leftward directions, and in the upward and downward directions (X and Z directions). When the screen unit 103 is attached to the slide mechanism, an upper end recess 115b provided at the upper end of the pivot plate 115 is fitted with an upper end bent part 131a of the hanger plate 131. This easily makes the fit between the tip bent part 132a of the holder plate 132 and the angular hole 115a of the pivot plate 115, thereby preventing the failure in attaching the screen unit 103.

The screen S is omitted from FIGS. 7 to 10 for the sake of convenience. Further, a lock holder 120, and plate springs 112 and 119 described later are omitted from FIGS. 7 and 8.

The structure for causing the screen unit 103 to pivot is described next.

Figure 8:
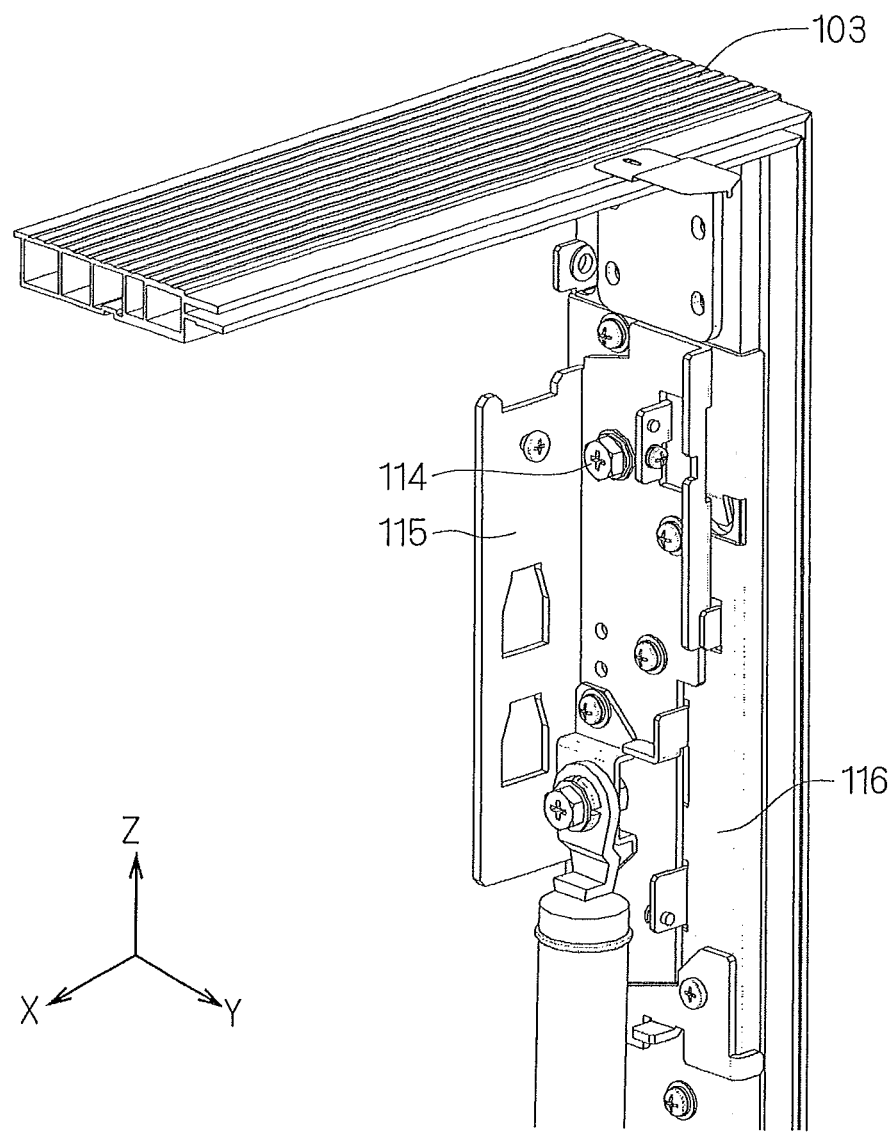
FIG. 8 is a perspective view of a pivot mechanism of the projection type image display device according to the preferred embodiment of the present invention.

FIG. 8 is a perspective view of a pivot mechanism of the projection type image display device 1 according to the preferred embodiment of the present invention. As shown in FIG. 8, a screen plate 116 is provided on the inner wall of the screen unit 103. The pivot plate (pivot mechanism) 115 for supporting the screen unit 103 is arranged by a shaft 114 at the upper portion of the screen plate 116, in a manner that allows the screen unit 103 to pivot about an axis extending from side to side in a direction approximately parallel to the screen S. As described above, the pivot plate 115 is fitted with the holder plate 132, and stands still accordingly. The screen unit 103 with the screen plate 116 arranged by the shaft 114 pivots.

As shown in FIG. 7, the screen unit 103 is provided with a gas spring 118 (elastic member) linked to the pivot plate 115 to generate elastic force for causing the screen unit 103 to pivot. A position for placing the gas spring 118 can be changed, at least at one end of the gas spring 118. The upper end of the gas spring 118 is arranged by a shaft 113 provided to an upper damper holder 121 of the pivot plate 115. The lower end of the gas spring 118 is arranged by a shaft 124 provided to a lower damper holder 122 of the screen plate 116. That is, one end of the gas spring 118 is attached to the pivot plate 115, and the other end of the gas spring 118 is attached to the screen unit 103.

The gas spring 118 generates spring force in a direction in which the gas spring 118 extends. The gas spring 118 generates spring force in such a manner as to cause the screen unit 103 to pivot in the +Y direction about the shaft 114 in FIG. 7. The screen unit 103 pivots in the +Y direction about the shaft 114 unless the screen unit 103 is locked and cannot pivot accordingly as described later. Further, by changing a position for placing the gas spring 118 either at the upper damper holder 121 or at the lower damper holder 122, or at both of them, the screen unit 103 of various sizes and various weights can be complied with.

Figure 9:
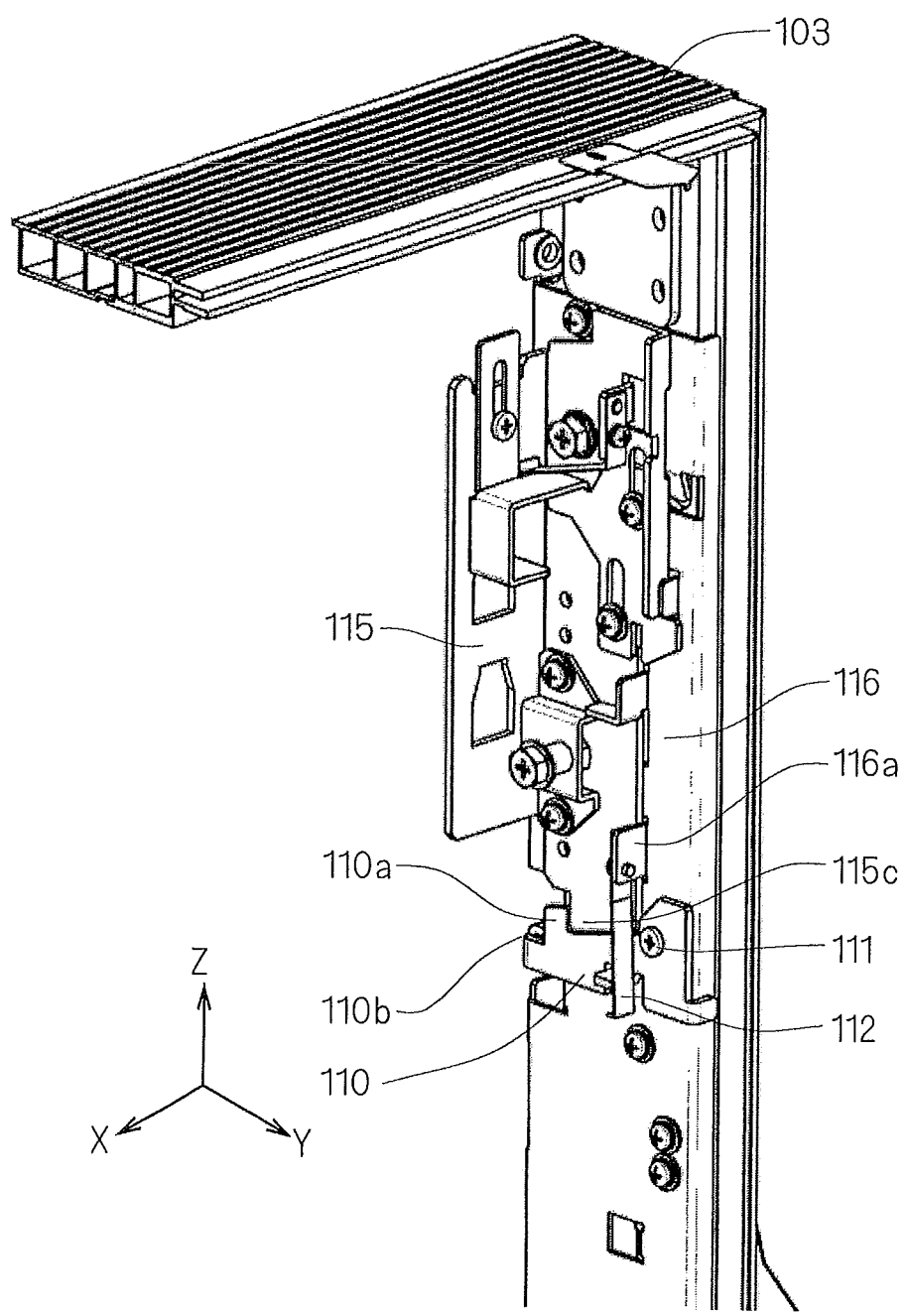
FIGS. 9 and 10 are perspective views of an open/close stopper of a screen unit of the projection type image display device according to the preferred embodiment of the present invention.

FIG. 9 is a perspective view of an open/close stopper of the screen unit 103 of the projection type image display device 1 according to the preferred embodiment of the present invention. The screen unit 103 is provided with the integrally formed screen plate 116 having a plate surface parallel to the surface of the screen S. A lock plate 110 (second lock member) is supported on the screen plate 116 by a shaft 111, in a manner that allows the lock plate 110 to pivot. The engagement thereby made between the pivot plate 115 and the lock plate 110 provided to the screen unit 103 allows the screen plate 116 to be locked. The lock plate 110 may be provided to one of the pivot plates 115. The lock plate 110 is locked at a predetermined position at which the screen unit 103 can be attached or detached.

The screen plate 116 has a bent part 116a provided with the spring plate 112 for applying spring force to cause the lock plate 110 to pivot in the −Y direction about the shaft 111. A holding part 110a of the lock plate 110 engages with a holding part 115c of the pivot plate 115 by the spring force applied by the plate spring 112, thereby locking the screen plate 116 so that the screen plate 116 does not pivot with respect to the pivot plate 115. When a bent part 110b of the lock plate 110 is pressed downward (in the −Z direction), the upper end of the holding part 110a moves out of engagement with the holding part 115c of the pivot plate 115. As a result, the lock of the pivot plate 15 is released so that the pivot plate 115 can pivot. After the release of the lock, the screen unit 103 is caused to pivot in the +Y direction about the shaft 114 by the spring force of the gas spring 118 and user's force. The gas spring 118 is omitted from FIG. 9 for the convenience of illustration.

Figure 10:
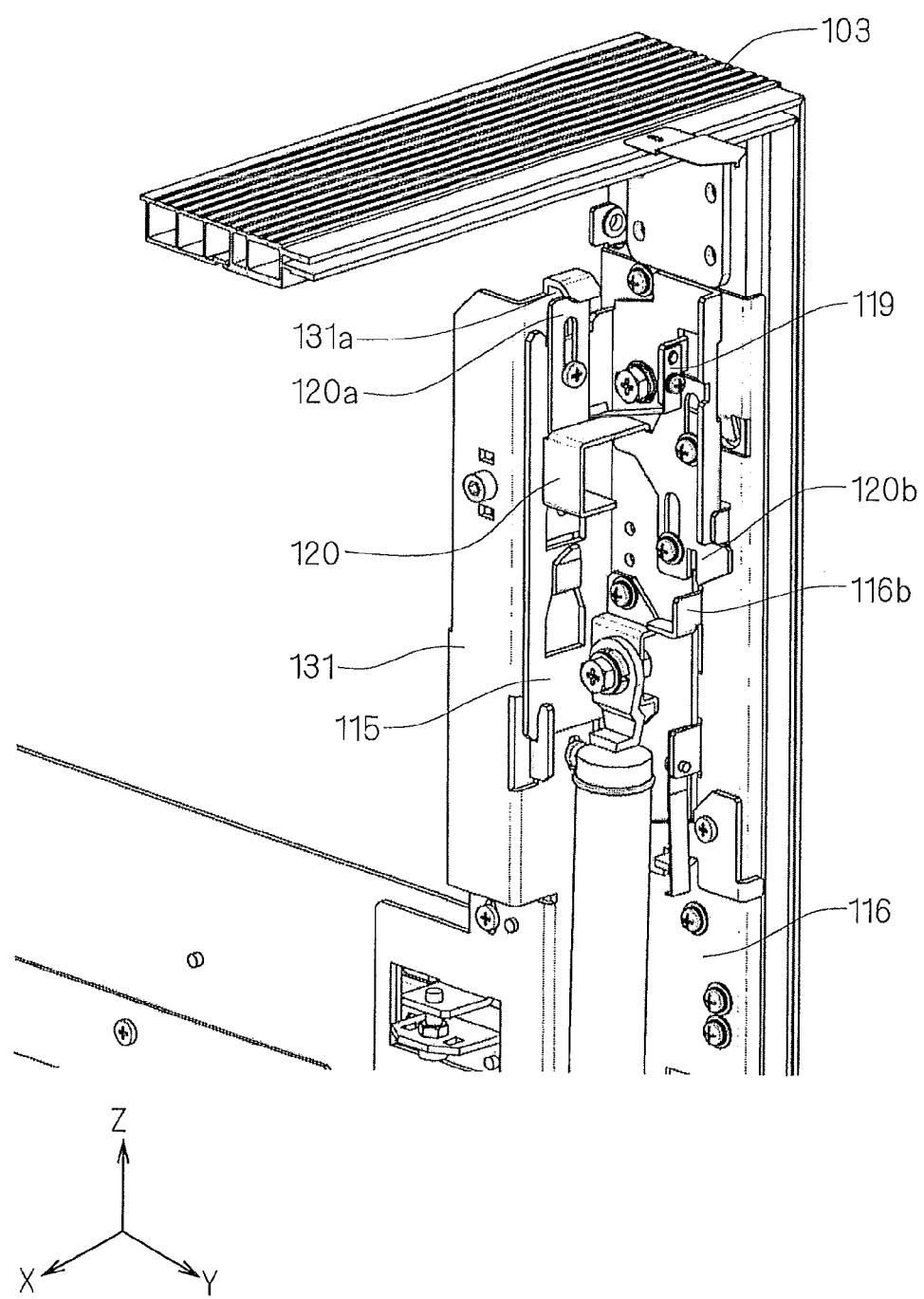

FIG. 10 is a perspective view of the open/close stopper of the screen unit 103 of the projection type image display device 1 according to the preferred embodiment of the present invention. As shown in FIG. 10, the pivot plate 115 is provided with the lock holder 120 movable in the approximately upward and downward directions. The lock holder 120 is intended to prevent the screen plate 116 from pivoting in a case except cases of necessity (in a case where the screen unit 103 is not attached to the casing 101, for example). The lock holder 120 is pushed in the approximately upward direction by the tip bent part 132a of the holder plate 132 shown in FIG. 7 when the screen unit 103 is attached to the casing 101. So, the pivot plate 115 is brought to a condition that allows the pivot plate 115 to pivot. When the screen unit 103 is detached from the casing 101, a user lifts the screen unit 103 in the approximately upward direction. At this time, an upper projection 120a of the lock holder 120 is pressed in the approximately downward direction by the upper end bent part 131a of the hanger plate 131. This causes a holding part 120b formed at a lower part of the lock holder 120 to engage with an upright part 116b of the screen plate 116. As a result, the screen plate 116 is locked so as not to pivot with respect to the pivot plate 115. When the screen unit 103 is not attached to the casing 101, the lock holder 120 is held pressed in the approximately downward direction (−Z direction) by the spring force of the plate spring 119 provided to the pivot plate 115, thereby preventing inadvertent release of the lock of the lock holder 120.

As a result, in the projection type image display device of the present preferred embodiment, only the change in length of the link shaft 141 is required in order to comply with the casing 101 of various sizes. Further, only the change in position for placing the gas spring 118 is required to comply with the screen unit 103 of various sizes and various weights. So, common members can be used even when the casing 101 or the screen unit 103 is changed in size or in weight, leading to cost reduction and inventory reduction.

The engagement mechanism shown in FIG. 7 allows the screen unit 103 to move without changing its adjusted position when the screen unit 103 is caused to move between the stored position and the protruding position by the slide base 106. So, when a plurality of projection type image display devices 1 are arranged in rows and columns to constitute a multi-projector, damage of neighboring screen units caused by the contact therebetween is prevented. Further, fine adjustment is realized by the position adjustment in the vertical direction (upward and downward directions) by the bolt 135 of the hanger plate 131, and the position adjustment in the horizontal direction (rightward and leftward directions) by the bolt 136 of the holder plate 132. Still further, by providing a remotely operable motor and the like coupled to these bolts, position adjustment is realized even when the screen unit 103 is very close to the casing 101.

Each of the slide stopper 104 and the lock plate 110 may be provided at least either on the right the side surfaces or on the left side surfaces of the casing 101 and the screen unit 103. Thus, when the screen unit 103 is of such a large size that a user cannot touch the screen unit 103 with both hands, the screen unit 103 can be handled with one hand.

As described above, by unitizing the screen unit 103 and members used to realize slide, the time required for assembling the projection time image display device 1 can be reduced.

While the invention has been shown and described in detail, the foregoing description is in all aspects illustrative and not restrictive. It is therefore understood that numerous modifications and variations can be devised without departing from the scope of the invention.

What is claimed is:

1. A projection type image display device, comprising:
   a screen unit with a screen onto which images are projected;
   a projection unit for projecting images onto said screen from the rear surface of said screen;
   right and left slide mechanisms as a pair for supporting said screen unit in a manner that allows said screen unit to move in a direction approximately normal to said screen;
   a link shaft for linking said right and left slide mechanisms, and for moving said right and left mechanisms in synchronization with each other; and
   a pivot mechanism including a pivot plate with a fitting hole so defined that said fitting hole is configured to be fitted with a hook-shaped projection of said slide mechanism.

2. The projection type image display device according to claim 1, wherein
   said pivot mechanism is configured to support said screen unit in a manner that allows said screen unit to pivot about an axis approximately parallel to said screen; and
   the projection type image display device further comprising:
   an elastic member coupled to said pivot mechanism, and which generates elastic force for causing said screen unit to pivot, a position for placing said elastic member being changed at least at one end of said elastic member.

3. The projection type image display device according to claim 2, wherein
   one end of said elastic member is attached to said pivot plate, and the other end of said elastic member is attached to said screen unit.

4. The projection type image display device according to claim 2, further comprising:
   a first lock member for locking said slide mechanism at a position that allows said screen unit to be attached and detached, and a second lock member for locking said pivot mechanism at a position that allows said screen unit to be attached and detached;

wherein said first lock member and said second lock member are each provided at least on one side of each of said slide mechanism and said pivot mechanism.

5. The projection type image display device according to claim 1, further comprising:
a casing with said right and left slide mechanisms, and storing therein said projection unit; and an engagement mechanism for engaging said casing and said screen unit, wherein
said engagement mechanism is provided at least either on the right side surfaces of on the left side surfaces of said casing and said screen unit.

6. The projection type image display device according to claim 1, further comprising:
a casing with said right and left slide mechanisms, and storing therein said projection unit; and
a position adjuster provided to said slide mechanism to make position adjustment of said screen unit with respect to said casing.

7. The projection type image display device according to claim 6, wherein said position adjuster includes:
a first position adjuster for making position adjustment of said screen unit in an approximately horizontal direction; and
a second position adjuster for making position adjustment of said screen unit in an approximately vertical direction.

8. A projection type image display device, comprising:
a screen unit with a screen onto which images are projected;
a projection unit for projecting images onto said screen from the rear surface of said screen;
right and left slide mechanisms as a pair for supporting said screen unit in a manner that allows said screen unit to move in a direction approximately normal to said screen;
a link shaft for linking said right and left slide mechanisms, and for moving said right and left mechanisms in synchronization with each other;
a casing with said right and left slide mechanisms, and storing therein said projection unit; and
an engagement mechanism for engaging said casing and said screen unit, wherein
said engagement mechanism is provided at least either on the right side surfaces of on the left side surfaces of said casing and said screen unit, and wherein
said engagement makes engagement between said casing and said screen unit by making the fit between a hook-shaped projection of said slide mechanism and a fitting hole defined in a pivot plate of said screen unit.

9. A projection type image display device, comprising:
a screen unit with a screen onto which images are projected;
a projection unit for projecting images onto said screen from the rear surface of said screen;
right and left slide mechanisms as a pair for supporting said screen unit in a manner that allows said screen unit to move in a direction approximately normal to said screen;
a link shaft for linking said right and left slide mechanisms, and for moving said right and left mechanisms in synchronization with each other;
a pivot mechanism for supporting said screen unit in a manner that allows said screen unit to pivot about an axis approximately parallel to said screen; and an elastic member coupled to said pivot mechanism, and which generates elastic force for causing said screen unit to pivot, a position for placing said elastic member being changed at least at one end of said elastic member;
a first lock member for locking said slide mechanism at a position that allows said screen unit to be attached and detached, and
a second lock member for locking said pivot mechanism at a position that allows said screen unit to be attached and detached; wherein
said first lock member and said second lock member are each provided at least on one side of each of said slide mechanism and said pivot mechanism, and wherein
said first lock member is locked by making the fit between a fixed projection and a movable recess constituting said slide mechanism, and
said second lock member is locked by the engagement between said pivot mechanism and a lock plate provided to said screen unit.

10. A projection type image display device, comprising:
a screen unit with a screen onto which images are projected;
a pivot mechanism for supporting said screen unit in a manner that allows said screen unit to pivot about an axis approximately parallel to said screen;
an elastic member coupled to said pivot mechanism, and which generates elastic force for causing said screen unit to pivot, a position for placing said elastic member being changed at least at one end of said elastic member; and
right and left slide mechanisms as a pair for supporting said screen unit in a manner that allows said screen unit to move in a direction approximately normal to said screen, wherein
said pivot mechanism includes a pivot plate with a fitting hole so defined that said fitting hole is configured to be fitted with a hook-shaped projection of said slide mechanism, and
one end of said elastic member is attached to said pivot plate, and the other end of said elastic member is attached to said screen unit.

11. The projection type image display device according to claim 10, further comprising a second lock member for locking said pivot mechanism at a position that allows said screen unit to be attached and detached, wherein
said second lock member is provided at least on one side of said pivot mechanism.

12. The projection type image display device according to claim 11, wherein
said second lock member is locked by the engagement between said pivot mechanism and a lock plate provided to said screen unit.

13. A projection type image display device, comprising:
a screen unit with a screen onto which images are projected;
a pivot mechanism for supporting said screen unit in a manner that allows said screen unit to pivot about an axis approximately parallel to said screen; and
an elastic member coupled to said pivot mechanism, and which generates elastic force for causing said screen unit to pivot, a position for placing said elastic member being changed at least at one end of said elastic member;
a slide mechanism for supporting said screen unit in a manner that allows said screen unit to move in a direction approximately normal to said screen;
a casing for storing a projection unit which projects images onto said screen; and an engagement mechanism for engaging said casing and said screen unit by making a fit between a hook-shaped projection of said slide mechanism and a fitting hole defined in said pivot mechanism.

14. A projection type image display device, comprising:
a screen unit with a screen onto which images are projected;
a pivot mechanism for supporting said screen unit in a manner that allows said screen unit to pivot about an axis approximately parallel to said screen; and
an elastic member coupled to said pivot mechanism, and which generates elastic force for causing said screen unit to pivot, a position for placing said elastic member being changed at least at one end of said elastic member;
a slide mechanism for supporting said screen unit in a manner that allows said screen unit to move in a direction approximately normal to said screen;
a first lock member for locking said slide mechanism at a position that allows said screen unit to be attached and detached, and
a second lock member for locking said pivot mechanism at a position that allows said screen unit to be attached and detached; wherein
said first lock member and said second lock member are each provided at least on one side of each of said slide mechanism and said pivot mechanism, and wherein
said first lock member is locked by making the fit between a fixed projection and a movable recess constituting said slide mechanism, and
said second lock member is locked by the engagement between said pivot mechanism and a lock plate provided to said screen unit.

* * * * *